United States Patent
Bruckner et al.

(10) Patent No.: US 7,755,250 B2
(45) Date of Patent: Jul. 13, 2010

(54) MEASURING SENSOR WITH AT LEAST ONE SAW (SURFACE ACOUSTIC WAVE) ELEMENT

(75) Inventors: Gudrun Bruckner, Wernberg (AT); Robert Hauser, Bodensdorf (AT); Leonhard M. Reindl, Kirchzarten (DE); Alexander Friedl, Graz (AT); Robert Strmsek, Hoce (SI)

(73) Assignee: AVL List GmbH, Graz (AT)

( * ) Notice: Subject to any disclaimer, the term of this patent is extended or adjusted under 35 U.S.C. 154(b) by 82 days.

(21) Appl. No.: 11/918,947

(22) PCT Filed: Apr. 20, 2006

(86) PCT No.: PCT/AT2006/000161
§ 371 (c)(1),
(2), (4) Date: Oct. 22, 2007

(87) PCT Pub. No.: WO2006/110936
PCT Pub. Date: Oct. 26, 2006

(65) Prior Publication Data
US 2009/0033175 A1 Feb. 5, 2009

(30) Foreign Application Priority Data
Apr. 21, 2005 (AT) .................... GM248/2005 U

(51) Int. Cl.
*H01L 41/08* (2006.01)
(52) U.S. Cl. ................................. 310/313 A
(58) Field of Classification Search ............ 310/313 A, 310/313 R, 313 D, 313 B, 323.21, 311; 333/195; 340/852.35, 10.1; *H01L 41/08; G08B 13/14*
See application file for complete search history.

(56) References Cited

U.S. PATENT DOCUMENTS 3,878,477 A    4/1975   Dias et al.

(Continued)

FOREIGN PATENT DOCUMENTS

DE    19851002    5/2000

(Continued)

OTHER PUBLICATIONS

English Abstract of EP 0827105.

(Continued)

*Primary Examiner*—Walter Benson
*Assistant Examiner*—Karen B Addison
(74) *Attorney, Agent, or Firm*—Dykema Gossett PLLC

(57) ABSTRACT

A measuring sensor comprises at least one SAW (surface acoustic wave) element (20) serving as a sensor and identification unit, which is installed in a contactless manner inside a housing part (10) forming, in essence, a coaxial conductor. The housing part (10) is connected to the shield (13) of the connection cable whose signal conductor (12) extends in a contactless manner over a superficial coupling structure of the SAW element (20) without contact. In order to improve the near-field coupling, the coupling structure of the SAW element (20) comprises additively coupling partial structures, which are arranged on both sides of the signal conductor (12) and which, preferably with at least one strip conductor, encircle, at least for the most part, the SAW element (20) in the peripheral area, and which serve as an integrated discharge loop for pyroelectric charges.

6 Claims, 2 Drawing Sheets

U.S. PATENT DOCUMENTS

| | | | |
|---|---|---|---|
| 4,423,395 A | 12/1983 | Shirahama | |
| 4,951,057 A | 8/1990 | Nagel | |
| 5,691,698 A * | 11/1997 | Scholl et al. | 310/313 R |
| 6,121,892 A * | 9/2000 | Reindl et al. | 340/5.8 |
| 2003/0069713 A1 | 4/2003 | Friedl et al. | |

FOREIGN PATENT DOCUMENTS

| | | |
|---|---|---|
| EP | 0827105 | 3/1998 |

OTHER PUBLICATIONS

English Abstract of DE 19851002.

\* cited by examiner

MEASURING SENSOR WITH AT LEAST ONE SAW (SURFACE ACOUSTIC WAVE) ELEMENT

BACKGROUND OF THE INVENTION

1. Field of the Invention

The invention relates to a measuring sensor comprising at least one SAW element serving as sensor and/or identification unit and having a housing part forming essentially a coaxial conductor into which the SAW element is installed in a contactless manner, and whereby said housing part is connected to the shield of the connection cable whose signal conductor extends in a contactless manner at least in the center across a superficial coupling structure of the SAW element, and whereby said signal conductor serves as near-field coupling of the electromagnetic field in the coaxial conductor with the SAW element.

2. The Prior Art

Measuring sensors of the aforementioned type are basically disclosed in AT 5.042 U2, for example, and have the advantage that the storage of partly very extensive sensor-relevant data can be stored away from the direct vicinity of the sensor with its high temperatures, vibrations and other interferences whereby only one identification unit with only a small number of identification data remains in or on the sensor, for example, with one identification sensor identification unit on the sensor itself having sensor recognition that can be correlated with the storage unit for sensor-relevant data. This small amount of identification data (e.g. a simple binary code) with its non-critical, simple and non-critical elements can be stored even in hostile ambient conditions and said data remains firmly connected with the sensor in a physical manner while any other sensor-related data (such as sensitivity curves, calibration data and the like) are present in the external storage unit whereby only examination of simple sensor recognition in terms of association is necessary to ensure the close relationship of sensor unit and sensor.

The design of the identification unit on the sensor can also have known SAW elements as mentioned in the beginning aside from the different simple design of the identification unit on the sensor as discussed also in the cited AT 5.042 U2. The use of surface acoustic wave (SAW) elements used as sensors and/or identification marks have been known for quite some time. Newer documents (Bruckner et al, Orc, 2003 IEEE Freq. Contr. Symp., 942 ff) have shown that such systems are especially suitable to be installed into existing technical systems as ID tags and/or for monitoring of physical or chemical parameters. It is thereby especially advantageous that such systems can be operated completely passive, which means no energy supply is needed as, for example, a battery in the region of the ID tag or the sensor. In addition, SAW elements are thermally and mechanically robust and they can be greatly reduced to miniature size and they can also be adapted in form and design for specific applications.

It is a state-of-the art and is disclosed in a great number of publications to couple SAW elements galvanic to the transmitting/receiving part or through electromagnetic far-field couplings by means of especially advantageous antennas for the respective application. It is also disclosed in EP 0827105 and EP 0502079, for example, to integrate a (transforming) coupling loop in the surface structures of the SAW element and to realize energy or signal transmission through inductive near-field coupling. The transmitting/receiving antenna is thereby a conductive loop designed and adjusted to coincide with the loop-shaped integrated antenna. These known solutions are sufficient and advantageous for a great number of technical applications. In contrast, not very well suited are the known coupling methods for installation of SAW elements into closed systems as, for example, pressure sensors for injection molding tools or for inner-pressure measurements of cylinders in internal combustion engines, especially if these are of compact design. The integration of SAW elements in such host-systems is of considerable more (potential) value, e.g. in the use of (passive) ID tags and/or sensors to monitor physical parameters (e.g. temperature, magnetic field forces, etc.) and/or chemical parameters (e.g. atmospheric components, thermal decomposition products, etc.)

All such uses have in common that the SAW system represents the completion of an existing system. This means that the entire SAW system is to be integrated into the host system whereby the entire SAW consists of a transmitting/receiving unit and the actual SAW element(s), in the rule without changes to the electric or installation/construction characteristics of the host system to be identified and/or to be monitored.

Coupling through a galvanic connection, which means a cable with a direct electric contact to the SAW element is not possible in many cases without influencing the actual useful signal of the host system in an inadmissible manner. Furthermore, a galvanic coupling in compact systems can be realized only with high costs in the production or assembly and/or it can be realized only limited in terms of being tolerant against high and/or changing temperatures, for example, especially over long periods, and against mechanical vibrations etc.

Coupling via an electromagnetic far-field coupling requires in the rule a massive constructive modification since a relatively large external antenna must be integrated as well as a free radio range between the transceiver and the SAW element, which often cannot be guaranteed in case of a sensor that is installed relative deeply in a metallic structure. Moreover, operating frequencies are limited to the (nationally different) ISM bands in such an arrangement, which therefore limits the maximal admissible transmitting power.

The third coupling method known from literature, which is an (inductive) near-field coupling between two congruent loops, is also not suited for practical application. The employment of an arrangement of this type would have, nevertheless, little or no negative influence on the useful signal and it requires no external antennas or long free radio ranges but it would need constructive changes through the greater space requirements for the internal coupling antenna as well as the required precise relative orientation of the SAW element and the coupling loop, if changes of this type would be possible at all or be admissible, and they would be complicated and expensive.

In total, a number of application suffer under these limitations of the practical application of SAW elements, e.g. for identification and monitoring functions. The invention intends to find a remedy hereby.

The basic design of many measuring sensors is similar to the aforementioned literature by Bruckner et. al (or as illustrated in FIG. 8 on page 470 of "Sensor 2003 Proceedings")—(compare FIG. 1 of the aforementioned state-of-the-art). The active element 11 is connected to the control and reading element through the inner conductor 12 of a coaxial cable. The sensor housing 10 forms thereby a coaxial conductor 13, in a physical sense, with corresponding electromagnetic field distribution. One or several SAW element(s) 20 can be installed thereby in a contactless manner into the housing 10, which is preferably supplied through a high frequency coaxial cable, and the energy supply of SAW elements take place as well as the return-transmission of signals generated in the SAW elements, which is performed through near-field coupling of the electromagnetic field in the coaxial conductor with the SAW element.

An arrangement of this type has a number of advantages for the present application in comparison to other systems in the art. The coupling of the signal occurs via the coaxial cable of the host system whereby an otherwise necessary extensive modificantion of the host system can be avoided. The coupling occurs contactless so that falsification of the host-system can be effectively prevented. Since the field is generated in an electromagnetic closed space, it is possible and admissible to use a freely selectable frequency or a frequency range, which is especially advantageous for the SAW element and which does not impair at the same time the function of the host system. The transmission power can be adjusted to the system as desired to a great extent. Installation into the host system is finally made possible in a simple manner since no additional electrically conductive connections must be established in the host system and the requirements for precision in orientation are relatively low.

However, the disadvantage in the known measuring sensors of the aforementioned type is the fact that the coupling efficiency of the coupling structure integrated on the SAW element is relatively low so that the quality of the signal is often insufficient to ensure dependable identification or measurement data transmission under unfavorable ambient conditions and over lengthy periods.

A critical factor for the proper function of the measuring process is also the design of the coupling antenna on the SAW element. Systems known in the art with a coupling structure integrated on the SAW element are selectively designed having capacitive coupling, as illustrated in FIG. 3, or having a transforming (inductive) coupling. An encircling coupling loop, e.g. as presented in the aforementioned patent EP 0827105, is unsuitable for the present application since the induced voltage is cancelled out through the circular B-field in a coaxial conductor. In a solution in which a closed coupling loop 211 is arranged on one side of the inner conductor, as illustrated in FIG. 2, is functional in principal but provides insufficient coupling efficiency for practical application. The same limitation is valid for the capacitive coupling structure illustrated in FIG. 3.

SUMMARY OF THE INVENTION

This object is achieved according to the present invention in a measuring sensor of the aforementioned type in that the coupling structure of the SAW element is provided with additively coupling partial structures, which are arranged on both sides of the signal conductor.

Additional characteristics and the respective advantages of the inventive embodiments are described in more detail with the aid of the drawings and the accompanying descriptions of the drawings.

DETAILED DESCRIPTION OF THE PREFERRED EMBODIMENTS

The interdigital transducers (IDT) 22, the reflectors 23, 25, 26, and the delay line 24 etc. are to be arranged between two independent, loop-shaped and interconnected coupling structures 213 to improve the coupling efficiency of the (primarily) inductive coupling between the electromagnetic field of the coaxial conductor and the SAW element. Through the separation of two loops running in opposite direction it is made possible to achieve an addition to the induced currents and the energy coupling in the SAW element, and the quality of the signals are improved thereby.

Figure 1:
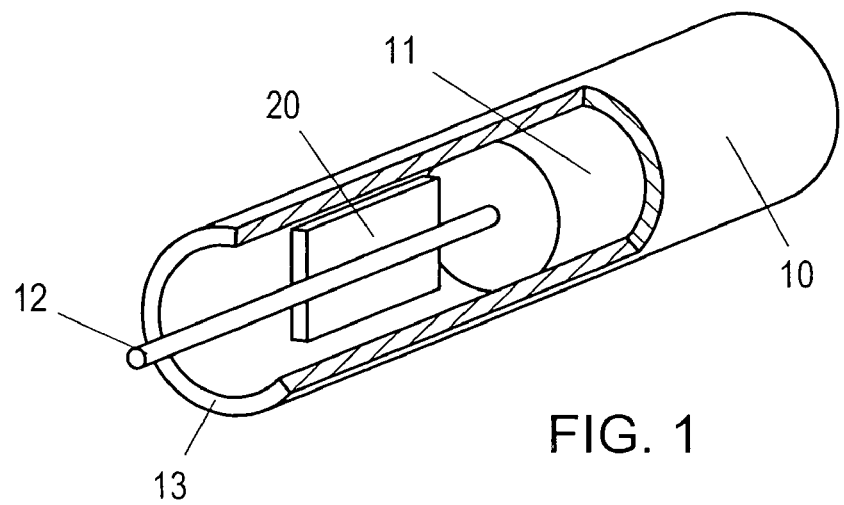
FIG. 1 shows the basic design of a measuring sensor according to the state-of-the-art.
Figure 2:
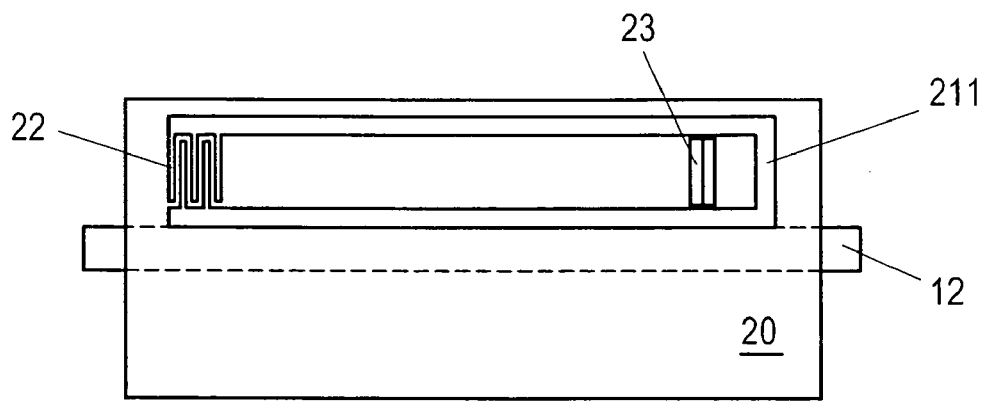
FIGS. 2 and 3 show schematically SAW elements with an integrated coupling structure as they can be employed in measuring sensors according to FIG. 1, and FIGS. 4 and 5 show details of the measuring sensors according to the present invention comparing them to the ones shown in FIG. 2 and FIG 3.
Figure 3:
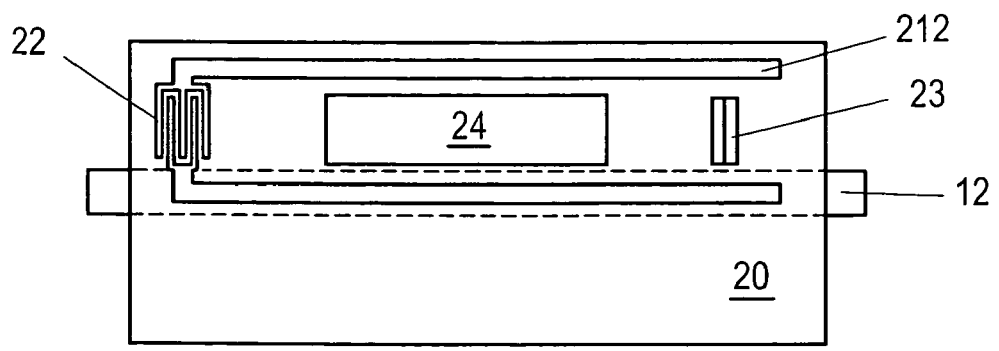
Figure 4:
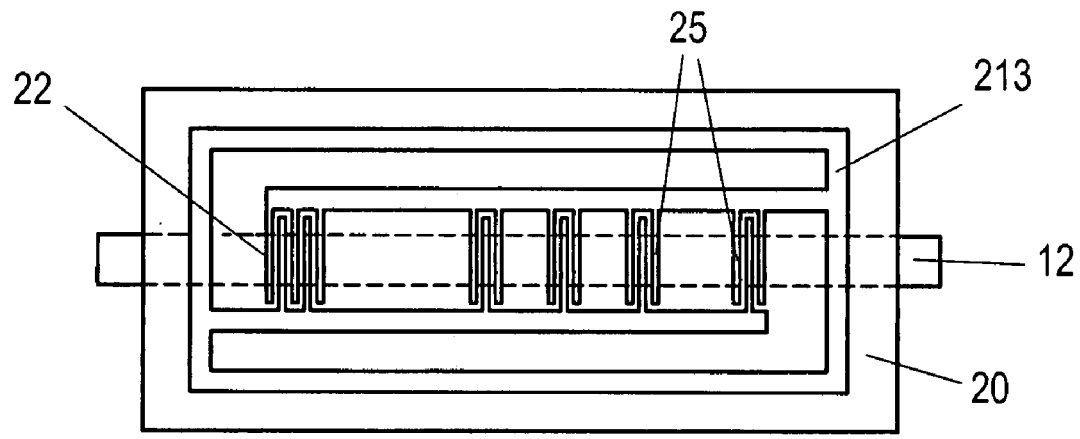
Figure 5:
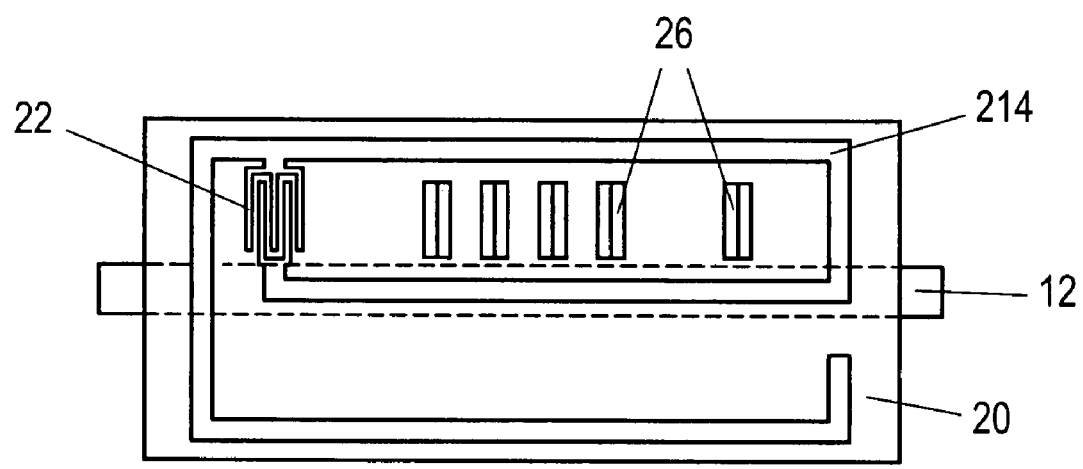

An additional structure of coupling loops suited for a specific application has as its goal to provide combined coupling of energy from the essentially circular magnetic field and the essentially radial electric field. This multi-functionality is of especial relevance since it is not possible to guarantee an electrical end of the chain of circuits designed for the operational frequency range of the SAW element. Uncontrollable field inhomogeneities are produced thereby in the coaxial conductor in the form of energy protuberances or energy knots. A SAW surface structure is thereby especially advantageous, which enables to effectively couple the two components. A structure 214 of this type is exemplary illustrated in FIG. 5. The design is asymmetrical relative to the inner conductor 12 and it ensures optimal use of inductive and capacitive coupling.

The structures on the SAW element represent an RLC oscillating circuit, in a physical sense. For an efficient conversion of the electromagnetic excitation energy into to an acoustic surface wave it is of great significance to adjust the oscillating characteristics of the RLS circuit to the operational frequency and to the material characteristics of the SAW element (resonant operation). This commonly occurs through an adjustment of the L-network and C-network of the oscillating circuit via external wiring with inductivities or capacities, as presented exemplarily in the patent DE 19851002. However, this stands in the way of miniaturizing. Moreover, SAW elements suited for high temperatures, e.g. up to 400° C., cannot be realized with external separate components. For applications of this type it is known in the art to adjust the inductive and capacitive characteristics through a suitable design of the structures on the SAW element. Examples include a variation in length of the structures or the width of the conductive micro-strip (influence on the inductive portion, L-component), including the forming of meandering structures, as well as a variation of the space between the conductive micro-strip (which means influence on the capacitive portion, C-component).

Since the dimensions of the SAW element of the present application are in the rule limited by the spatial values of the host system, the above-mentioned adjustments are possible only in a very restricted way. Meander structures or comparable space-requiring designs cannot be (meaningfully) realized in most cases and a variation of the length or the space between the conductive tracks is kept within limits through the geometric dimensions of the SAW element. According to an advantageous embodiment of the invention, adjustment of the active ohmic resistance portion R is proposed to optimize the coupling circuit. This adjustment is performed preferably through an adjustment of the diameter of the conductor track whereby this change in diameter is achieved through varying the thickness of the layer of the conductor track partially or at a certain path to make allowance for spatial limitations.

An additional important measure for the function of a SAW element, comprising an electromagnetic coupling structure integrated in the surface structure, is the adjustment of radiation resistance of the coupling structure to the wave resistance of the coaxial conductor, whereby said coupling structure is essentially to be seen as an antenna. This is made possible in an especially simple and advantageous manner through the adjustment of the thickness of the surface structures or of portions of the surface structures according to the invention. For example, it is possible, based on the arrangement illustrated in FIG. 5, to greatly improve the signal strength through a suitable variation of the layer thickness (of portions) of the conductor tracks (however, not the comb-shaped structures, i.e. of interdigital transducers and the reflectors, etc.) For this purpose, one or a plurality of layers of a conductive material, e.g. pure aluminum, is typically applied as a layering system consisting of a basic layer made of several materials. The application of these additional layers represents typically an increase in height of the layer thickness of the surface structures on the SAW element by a factor of 2 through 10.

An additional advantageous embodiment of the SAW surface structure according to the invention includes the integration of a discharge loop for pyroelectric charges. Pyroelectric effects are a common problem in SAW elements used at high temperatures. Most of the available materials suitable for high-temperature SAW applications with good coupling characteristics have pyroelectric characteristics, which can lead to a build-up of electric charges on the surface along the SAW element through the high degrees of temperature. The thereby developing charges can reach the kV/cm range. Through the sudden discharges by flash-over voltage, the stored energies are sufficient to destroy surface structures, e.g. interdigital transducers or reflectors, and thereby cause unrepairable damage to the SAW element. It makes sense to encircle the structures with one or a plurality of discharge loop(s) to avoid such charges. It is meaningful in case of highly compact SAW elements to integrate said discharge loop(s) into the structures necessary for the operation of the SAW element. The structures act thereby at the same time as an LC-oscillation circuit for the high-frequency operational conditions of the SAW element and as a current-limiting loop for the compensating currents of the pyroelectric charge transfer.

Contacts on the SAW element, as they are required for functional testing before installation, can be advantageously integrated as well in the structures for field coupling.

In conclusion, the described surface structures to be used on a SAW element represent a very well suited technical solution for heretofore unresolved problems of significantly limiting application possibilities in the areas of contactless near-field coupling, the adjustment of the oscillation characteristics, and the protection of structures against damage through pyroelectric discharge.

The invention claimed is:

1. A measuring sensor comprising at least one SAW element (20) serving as sensor and/or identification unit and having a housing part (10) forming essentially a coaxial conductor into which the SAW element (20) is installed in a contactless manner, and whereby said housing part is connected to the shield (13) of the connection cable whose signal conductor (12) extends in a contactless manner at least in the center across a superficial coupling structure (213, 214) of the SAW element (20), and whereby said signal conductor serves as near-field coupling of the electromagnetic field in the coaxial conductor with the SAW element (20), wherein the coupling structure (213, 214) of the SAW element (20) is provided with additively coupling partial structures, which are arranged at both sides of the signal conductor (12).

2. A measuring sensor according to claim 1, wherein the active components of the SAW element (20), such as interdigital transducers (22), the reflectors (23, 25, 26), and the delay line (24) etc. are to be arranged between two independent, loop-shaped and interconnected partial structures of the coupling structure (213), which mirror essentially the conductor track (12).

3. A measuring sensor according to claim 1, wherein a mainly inductive coupling antenna structure is attached on one side of the signal conductor (12) and a mainly capacitive coupling antenna structure serving as a partial structure of the coupling structure (214) is arranged on the other side of said signal conductor to combine the energy coming from the essentially circular magnetic field and the essentially radial electric field.

4. A measuring sensor according to claim 3, wherein the partial structures (213, 214) encircle, at least for the most part, the SAW element (20) with at least one of the conductor tracks in the peripheral area and serve as an integrated discharge loop for pyroelectric charges.

5. A measuring sensor according to claim 4, wherein the effective part of ohmic resistance can be changed through an adjustment of the diameter of the conductor tracks of the coupling structure (213, 214), preferably through a variation of the layer thickness applied on the conductor tracks, at least in specific areas, to adjust the operations frequency and/or the material characteristics and/or the radiation resistance.

6. A measuring sensor according to claim 5, wherein the coupling structure (213, 214) of the SAW element (20) is provided with additional contacts for the functionality test devices or the like.

* * * * *